2,746,196

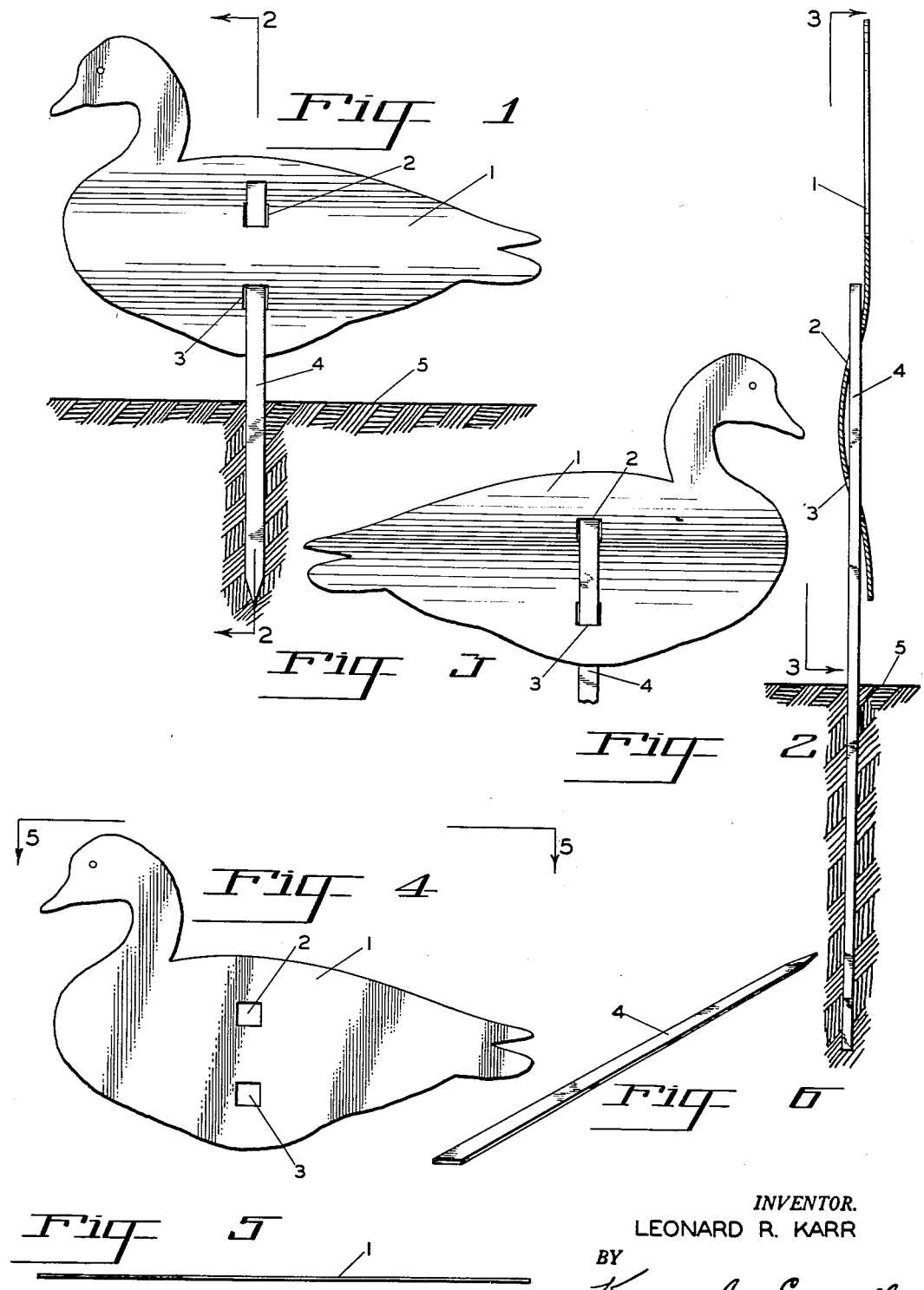

WATER FOWL DECOYS

Leonard R. Karr, Yakima, Wash.

Application September 3, 1954, Serial No. 453,996

1 Claim. (Cl. 43—3)

This invention relates to decoys for water fowl and is particularly adapted for utility in the hunting of geese, ducks, and other related water fowl.

One of the primary objects of this invention is to provide a decoy constructed of a flat sheet of material, the decoy being supported on a relatively slender post or shaft.

A further object of this invention is to provide a decoy which closely resembles the fowl it is desired to lure, the decoy being constructed of a single flat sheet of material and detachably connected to a supporting post or shaft whereby the same may be knocked down to occupy relatively small space while being transported to the hunting grounds.

Another object of this invention is to support the decoy on a relatively slender post in such a manner that the decoy may sway slightly under variations of wind pressure.

Other and further objects and advantages of this invention will become more apparent from a consideration of the appended drawing when read in the light of the following specification and claim.

In the drawing:

Figure 1 is a side elevation of a decoy constructed in accordance with this invention, and illustrating the detachable connecting means for supporting the decoy on a post or shaft.

Figure 2 is a cross-sectional view of the decoy taken on the vertical plane of line 2—2 of Figure 1, looking in the direction of the arrows.

Figure 3 is a side elevation of the opposite side of the decoy shown in Figure 1, the view being taken on the vertical plane of line 3—3 of Figure 2, looking in the direction of the arrows.

Figure 4 is a side elevation of the decoy, per se.

Figure 5 is an elevational view of an edge of the decoy shown in Figure 4, the view being taken on the horizontal plane of line 5—5 of Figure 4, looking in the direction of the arrows.

Figure 6 is a perspective view of the supporting means for the decoy.

Referring now more specifically to the drawing, reference numeral 1 designates a sheet of material cut in a configuration of the fowl desired to be hunted. The decoy illustrated in the accompanying drawing has been constructed to resemble a duck.

This invention contemplates that the decoy sheets may be cut in various forms, as for example, the head may be extended downwardly to simulate a bird in feeding position.

The decoy sheet 1 is provided with a pair of substantially equilateral rectangular openings 2, 3, the openings 2, 3 being centrally disposed relative to the main body of the decoy and are vertically aligned.

The decoy is supported on the upper end of an elongated substantially rectangular post 4, the upper end of the post extending through the lower opening 3 to one side of the decoy, and is extended upwardly through the other opening 2 to the front side of the decoy and terminating short of the upper end of the sheet 1, reference being made to Figure 1 of the drawing. The other end of the post 4 is sharpened and is adapted to be inserted into the hunting ground 5.

While in most instances the post 4 will be pushed into the ground in a vertical position, it may also be found desirable to insert the lower end thereof in an inclined position, the position of the stake 4 relative to the ground 5 depending upon how the hunter wishes to have the decoy appear from the air.

By constructing the decoy from one piece of sheet material and in providing a simple support and connecting means for the support and decoy, it will be readily apparent that the same may be easily knocked down for transport to the hunting field, and may be quickly connected for service in the field. The construction is such that the decoy occupies a minimum of space.

By constructing the supporting post 4 of relatively thin flexible material, the decoy 1 is subject to movement by variations in wind pressure, a feature which serves to attract the attention of the fowl in the air.

The rectangular openings 2 and 3 cooperate with the rectangular post 4 to prevent all pivotal action between the post 4 and the decoy sheet 1.

If desired, the decoys may be colored or painted to resemble the fowl being lured.

Having described and illustrated one embodiment of this invention in detail, it will be understood that the same is offered merely by way of example, and that the invention is to be limited only by the scope of the following claim.

What is claimed is:

A decoy for fowl comprising a relatively thin sheet of material cut to simulate the configuration of the fowl to be lured, said sheet having a pair of oppositely disposed upper and lower ends, said sheet of material having the central body portion thereof provided with a pair of vertically spaced substantially equilateral rectangular openings extending transversely therethrough and disposed adjacent each of said ends, respectively, support means for said decoy comprising an elongated substantially rectangular in cross section and relatively thin post, said post having one end thereof threaded through said substantially equilateral rectangular openings with said one end of said post extending across the sides of said central body portion and terminating short of said upper end of said sheet, the other end of said post being pointed to facilitate the insertion of said other end of said post into the ground, and said post being constructed of a flexible material whereby wind gusts impinging upon said decoy causes the same to sway.

References Cited in the file of this patent

UNITED STATES PATENTS

| | | |
|---|---|---|
| 278,461 | Screven | May 29, 1883 |
| 1,473,612 | Dewey | Nov. 13, 1923 |
| 1,508,717 | Page | Sept. 16, 1924 |
| 1,603,114 | Johnson | Oct. 12, 1926 |
| 2,461,054 | Green | Feb. 8, 1949 |

FOREIGN PATENTS

| | | |
|---|---|---|
| 621,277 | Great Britain | 1949 |